(12) United States Patent
Marshall

(10) Patent No.: US 8,785,835 B1
(45) Date of Patent: Jul. 22, 2014

(54) THREE-DIMENSIONAL FILTER ENABLES ADAPTIVE FOCUS SENSING

(71) Applicant: Daniel R. Marshall, Boise, ID (US)

(72) Inventor: Daniel R. Marshall, Boise, ID (US)

( * ) Notice: Subject to any disclaimer, the term of this patent is extended or adjusted under 35 U.S.C. 154(b) by 0 days.

(21) Appl. No.: 13/738,358

(22) Filed: Jan. 10, 2013

(51) Int. Cl.
*H01J 3/14* (2006.01)
*G01J 3/50* (2006.01)
*G01J 1/04* (2006.01)

(52) U.S. Cl.
CPC ............. *G01J 1/0407* (2013.01); *G01J 1/0474* (2013.01)
USPC .......................................... 250/216; 250/226

(58) Field of Classification Search
USPC .................. 250/216, 226, 221, 573, 574, 239
See application file for complete search history.

(56) References Cited

U.S. PATENT DOCUMENTS

| | | | |
|---|---|---|---|
| 3,458,249 A * | 7/1969 | George | 359/241 |
| 4,890,075 A * | 12/1989 | Pohlmann et al. | 359/886 |
| 5,151,819 A * | 9/1992 | Stephens | 359/350 |
| 6,624,899 B1 | 9/2003 | Clark | |
| 6,747,796 B1 * | 6/2004 | Dorling | 359/452 |
| 7,348,528 B2 | 3/2008 | Marshall | |
| 7,511,800 B2 | 3/2009 | Lewis | |
| 7,538,335 B1 * | 5/2009 | Leard | 250/559.16 |
| 8,698,151 B2 * | 4/2014 | Sawano | 257/59 |

* cited by examiner

*Primary Examiner* — Pascal M Bui Pho
(74) *Attorney, Agent, or Firm* — Your Intellectual Property Matters, LLC; Robert A. Frohwerk

(57) ABSTRACT

This focus sensor is readily usable in a system using pupil obscuration to measure the state of focus of a light beam. A scattering volumetric filter modifies a three-dimensional wavefront so that focus can be detected by a two-dimensional detector for conversion to a one-dimensional signal having values of plus, zero and minus. This diffusing filter comprises sub wavelength particles having a high index of refraction suspended in an adhesive to produce a solid diffuser. This focus sensor enables a well-behaved focus curve having a constant slope near best focus, while maintaining a slope that is either constant or monotonic at a minimal rate over an extended distance to support a long capture-range over which a focus-controlling servo-mechanism can acquire and maintain focus in the presence of corrupting target surface topography or optical defects.

18 Claims, 5 Drawing Sheets

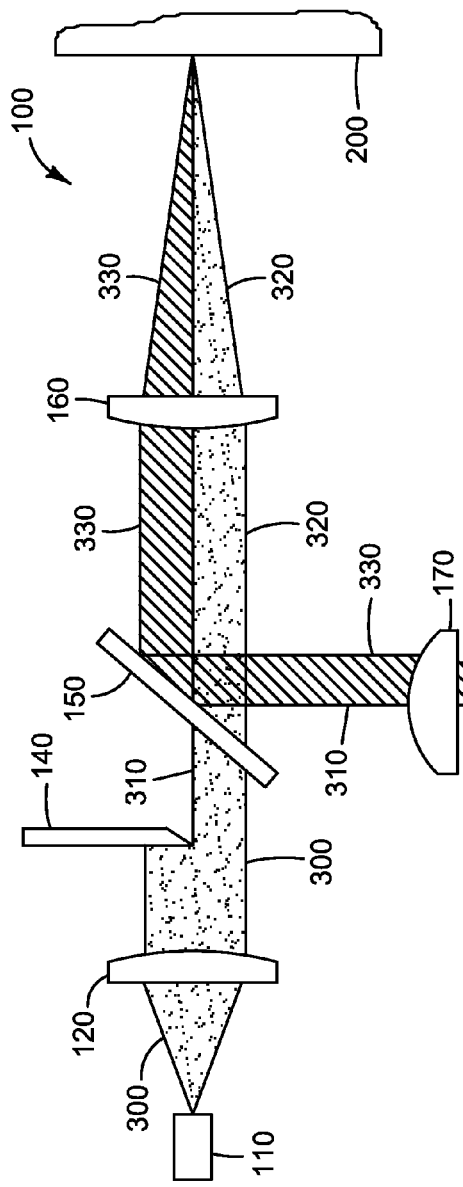
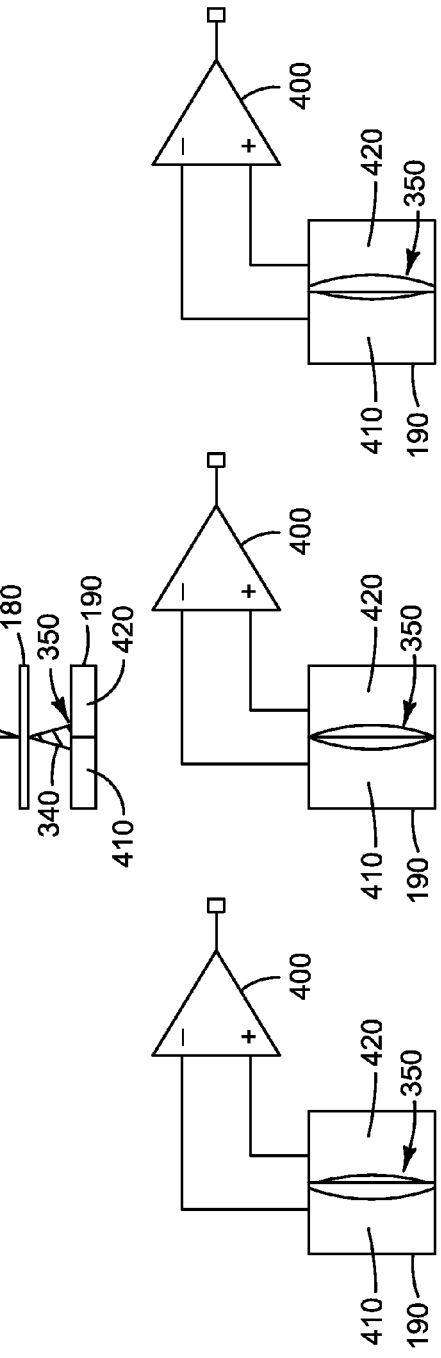
FIG. 4
FIG. 5A  FIG. 5B  FIG. 5C

THREE-DIMENSIONAL FILTER ENABLES ADAPTIVE FOCUS SENSING

CROSS-REFERENCES TO RELATED APPLICATIONS

U.S. patent application Ser. No. 12/833,974, filed Jul. 10, 2010, entitled "Three-Dimensional Filter plus Sensor Assembly Improves Focus Sensing", is incorporated here by reference in its entirety.

FIELD OF THE INVENTION

The present invention relates generally to an optical position sensor used to measure optical focus. In particular, this invention includes an optical sensor assembly that employs a structured three-dimensional element to control the two dimensional distribution of irradiance that falls upon an active sensing surface.

BACKGROUND OF THE INVENTION

For purposes of the present discussion, a focus sensing system is a device that senses focus for, and enables control of, a focusing optical device. Because the usable depth of field of an imaging device decreases rapidly with the increase in resolution, focus control is especially critical in microscopy. In its most general form an ideal focus sensing device optically senses a wavefront curvature term that indicates the state of focus of the wavefront, while being insensitive to other kinds of wavefront shapes. Such a system may be a component of a focus controlling servomechanism, i.e., an autofocus system, or it may be used to measure the distance between a reference surface and a target surface without controlling focus.

The state of focus of an optical system can be described as the spherical curvature of an idealized electromagnetic wavefront as it propagates through the system. An ideal focus sensing method should reject wavefront information other than that which indicates the state of focus. In short, focus is a phase-related term of an idealized wavefront as it propagates through an optical system at the speed of light. However, proper sensing of focus is complicated by the fact that available square-law detectors are sensitive to the square of the amplitude of the wave, but are not directly sensitive to the complex (in the mathematical sense of real plus imaginary) properties that describe a wave, namely phase or amplitude. A robust focus sensor must also separate the focus signal from other variables, including those that are related to the target as well as those emanating from the focus sensing system itself.

In addition to square-law detectors, other optical components have been used for the task at hand. These include, among others, lenses, mirrors, beam splitters, and various filters for the refraction and reflection of light, for wavelength selection or rejection, for manipulation of polarization, and other typical optical purposes. When optical filters have been used they have been designed to operate as two-dimensional devices. That is, their salient properties are intended to operate on the two-dimensional properties of a beam of light as it passes through the filters. Even though a filter may have been composed of three-dimensional structures, its function has been essentially restricted to two-dimensions with regard to the light beam itself. In fact, in many cases those filters may be translated axially by a relatively large distance as compared to the depth of focus of image-forming components without significantly altering their function in the system. By contrast, the specially constructed filter used in the optical system described here improves both the axial and radial focus-sensing operation of square-law detectors. These filters not only employ three-dimensional structures, but also function fully in three dimensions by means of refraction, diffraction, interference or scattering. The functions of the described filters require unique axial and radial positioning in order to achieve optimal performance. The functionality of previous filters has been degraded by sensitivity to errors caused by sample topography, tilt, reflectance variation and surface patterns; furthermore, non-ideal properties of the measurement device itself have caused significant errors.

BRIEF SUMMARY OF THE INVENTION

The presently described optical sensor assembly and associated techniques relate generally to measurement of axial distance by a beam of light, especially as used in an optical sensor. At the heart of the assembly is an engineered filter. The described assembly enables fully automatic focus sensing and control in biology, metallurgy, industrial inspection, semiconductor processing, laser ablation and other applications that depend upon precise control of axial distances for microscopic measurement and control.

In one system using the presently described filter, a beam of light is projected through an objective lens onto a target surface, and then collected on a square-law detector to infer the state of focus of an optical beam. The specially constructed filter alters the beam properties in all three dimensions to improve the quality of the focus curve over a wide range of focus states, smoothing the focus curve and eliminating the concern of multiple zero crossings, which would create an ambiguous or incorrect focus signal.

An additional property of measurements of axial distance using this filter is extended capture range, as shown by the fact that the sensing curve flattens in the regions away from the zero crossing and does not return to, or cross over zero. In other words, the sensing curve does not drop back to zero, but maintains its distance from zero crossing, even at relatively large axial distances of the objective lens from best focus. This second property is beneficial for automating the control of focus because it increases the range of operation of the control system.

The presently described filter is suitably constructed in three dimensions such that the resulting focus error curve is substantially desensitized with regard to both non-ideal systemic behavior and corrupting effects at the surface which is being measured. A number of different properties must be combined to provide correct mathematical properties of the sensing curve at different axial positions of the objective lens. For example, the sensing curve must be steep and linear in the immediate region around best focus, but essentially flat and unchanging in the regions away from best focus. Because multiple operational properties must be carefully controlled both the components and the operations used in making these filters must be precisely controlled. Some of the factors that need to be considered in constructing and operating this filter are:

1. Depth of the included scattering region;
2. Homogeneity, or controlled deviation therefrom, of the scattering layer in all three dimensions;
3. Refractive index of the medium that supports scattering bodies;
4. Typical size of the scattering bodies or engineered structures within the scattering layer; such size is often small relative to the wavelength of the incident light in order to improve their scattering properties where the effective region of the filter is predominately or exclusively made up of small scattering bodies, or where the effective region is viewed as one or more phase objects, the axial extent of the phase features may be similarly small;
5. Lateral size that is large enough to avoid lateral vignetting of the beam;
6. Materials and configurations that create a scattering pattern that supports the kind of focus curve desired. In particular, the entire region may create its effects primarily or entirely through controlled variation in phase, that is, it may be a phase object;
7. Shape of the interface between the external environment (e.g. air surrounding the interface) and the refracting/scattering structure, combined with refractive index of the suspending medium in order to provide suitable lensing effects;
8. Changes or discontinuities in refractive index, as employed to reduce or eliminate stray reflections;
9. Control of layer thickness of one or more layers in order to suppress reflection at discontinuities in refractive index; and
10. Control of dynamic properties of components and the way in which they affect the resulting properties of the filter; for example, surface tension of polymer liquids and their attachment to detector mounting surfaces as they affect the curvature of the resulting structure.

One filter material that satisfies the above criteria is a suspension of subwavelength-sized particles having a high index of refraction when compared to the suspending medium. One material for such scattering particles is titanium dioxide, $TiO_2$. These particles are suspended in a polymer, such as one that is used as an optical adhesive, to produce a solid diffuser after curing. The result is a clear glass-like substrate with a strongly scattering white layer comprising very small scattering bodies. This structure is applied in a controlled shape, possibly having multiple layers that augment the operation of the scattering medium by means of a combination of refraction, scattering, interference and diffraction. The advantages of such a filter with regard to its construction and operation will become apparent in the detailed discussion that follows.

BRIEF DESCRIPTION OF THE DRAWINGS

The particular features and advantages of the filter briefly described above will become apparent from the following description taken in conjunction with the accompanying drawings, in which:

FIG. 4 is a schematic of a focus sensing system using Pupil Obscuration, similar to FIG. 3, with the addition of a scattering filter;
FIG. 5 demonstrates how a comparator coupled to a two-segment detector senses the state of focus with FIG. 5A producing a negative comparison to indicate "too close", FIG. 5B resulting in a zero match as an indication of being in focus, and FIG. 5C providing a positive comparison corresponding to "too far"

Figure 1:
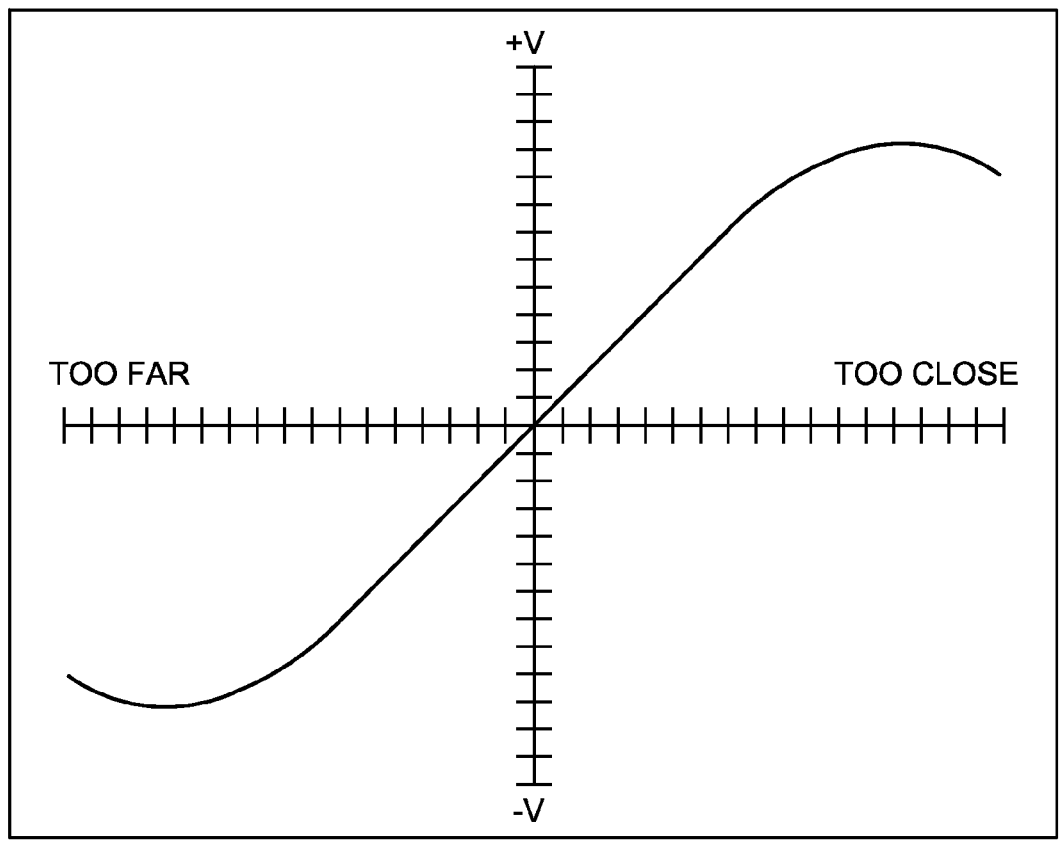
FIG. 1 shows an idealized focus sensing curve.

The following Reference Numbers may be used in conjunction with one or more of the accompanying FIGS. 1-6 of the drawings:
100 Focus Sensing System
110 Light Source
120 Collimator
140 Knife-edge element
150 Beamsplitter
160 Objective Lens
170 Detector Lens
175 Dielectric Medium
180 Diffuser
185 Structured Filter
190 Detector
200 Target
300 Light Beam, outgoing
310 Optical axis
320 Reference Beam, outgoing
330 Reference Beam, incoming
340 Scattered (Diffused) Beam
350 Image of Scattered (Diffused) Beam on Detector
400 Comparator
410 Sensor Element, first
420 Sensor Element, second

DETAILED DESCRIPTION OF THE INVENTION

The diffusing filter described here may be used in a focus sensing system wherever it is important to measure the state or quality of focus of a light beam, and for other purposes. This specially constructed filter alters the properties of a light beam in all three dimensions. Its operation is essentially one of three-dimensional spatial averaging of optical flux in order to transform complex (real plus imaginary) three-dimensional amplitude and phase into a distribution of irradiance upon a sensing surface of a detector that is essentially two-dimensional. The distribution that results from this transformation provides an improved measurement of wavefront topography that measures "focus".

Figure 2:
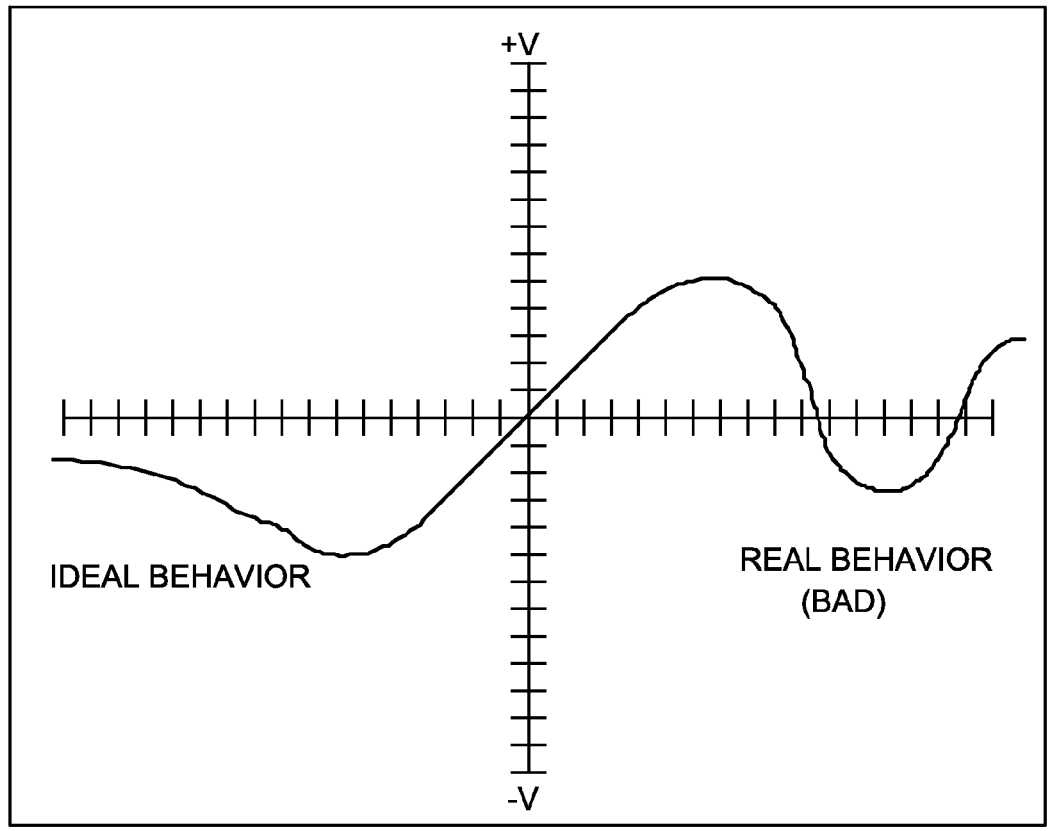
FIG. 2 shows a faulty focus curve with local slope changes and multiple zero crossings.

An idealized focus sensing curve is shown in FIG. 1, whereas FIG. 2 shows a focus curve having local variations in slope in addition to multiple zero crossings. Focus error curves such as these are generated by a system such as that shown in the schematic of FIG. 3. Here, a beam of light is projected through an objective lens and focused onto a target. A portion of the returned beam is selectively removed with the remainder of the beam being collected on a square law detector to infer the state of focus. This is a technique called "pupil obscuration" focus sensing wherein a portion of the optical pupil is obscured by a knife-edge so that there is an asymmetric distribution of irradiance at the detector on either side of focus. In other words, by obscuring a portion of the beam in the optical pupil, axial focus-related variation in the distribution of light is converted to radial variation at a substantially two dimensional detector. This radial variation is much easier to measure than axial irradiance variation.

Figure 3:
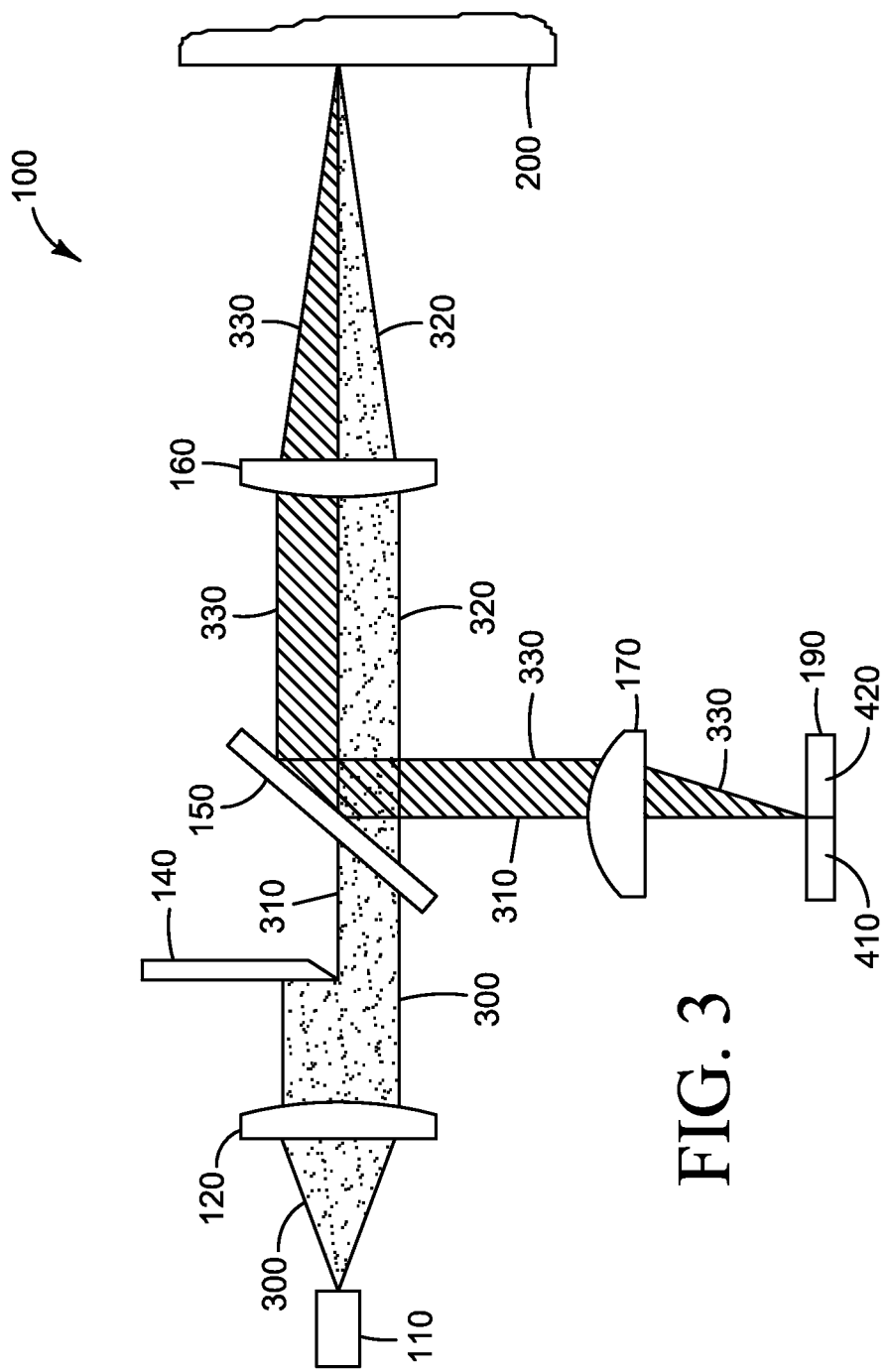
FIG. 3 is a schematic of a focus sensing system using Pupil Obscuration.

In the focus sensing system of FIG. 3, Light Source 110 emits an outgoing light beam 300, which is collimated by a Collimator Lens 120. A portion of the collimated beam (300) on one side of the optical axis 310 is blocked by a knife-edge element 140. The unblocked portion of outgoing light beam 300 becomes the outgoing Reference Beam 320 which passes through the Beamsplitter 150 and then through the Objective Lens 160 to the Target 200. Since the outgoing Reference Beam 320 is in a state of collimation, the use of an Objective Lens 160 that has been corrected for infinity creates a correctly focused image when the projected beam creates a focused spot on the Target 200.

Upon reflection from the surface of the Target 200, the outgoing Reference Beam 320 becomes incoming Reference Beam 330. This portion of the reflected beam returns through the Objective Lens 160 to be reflected by the Beamsplitter 150 into the Focusing or Detector Lens 170. After being focused by the Detector Lens 170, the incoming Reference Beam 330 is directed onto the Detector 190 which is a square-law device whose spatial sensitivity correlates its output with the state of collimation or focus of the reflected beam. The Detector 190 comprises multiple sensors, the outputs of which are processed by Comparator 400, a differencing amplifier, to produce a focus error signal. In a most basic configuration, for example, the outputs of first and second Detector Sensing Elements (410 and 420) are compared to produce the focus error signal. The ideal focus curve has best focus when the differencing amplifier of the detector comparator reports an output of zero volts.

Now consider the effects shown in FIG. 4 of introducing a scattering element, Diffuser 180, into the optical path in association with the Detector 190. The Detector Lens 170 is focused such that the projected beam simultaneously focuses on the Target 200 and the center of the three-dimensional Scattering region within Diffuser 180. Although other methods of focus sensing may be adapted for use with a scattering window such as Diffuser 180, pupil obscuration is preferred.

In FIG. 5 it can be seen that as the Target 200 in FIG. 4 moves in and out of focus the Image 350 of Scattered Beam 340 will impinge differentially upon the Detector 190. As shown in FIG. 5A, when Target 200 is too close, a Comparator 400 coupled to the two Detector Sensing Elements (410 and 420) of Detector 190 will generate a negative comparison. When Target 200 is in focus, as shown in FIG. 4, the two Detector Sensing Elements will be equally illuminated by the Scattered Beam 340 and the Comparator 400 will balance to indicate that focus is achieved. FIG. 5C shows the situation wherein Target 200 has moved too far away, out of focus, so that Detector Sensing Element 420 is more fully illuminated than Detector Sensing Element 410 causing Comparator 400 to produce a positive output. The choice of polarity in this example is purely arbitrary, and may be reversed by changing either optical or electronic component relationships.

Figure 6:
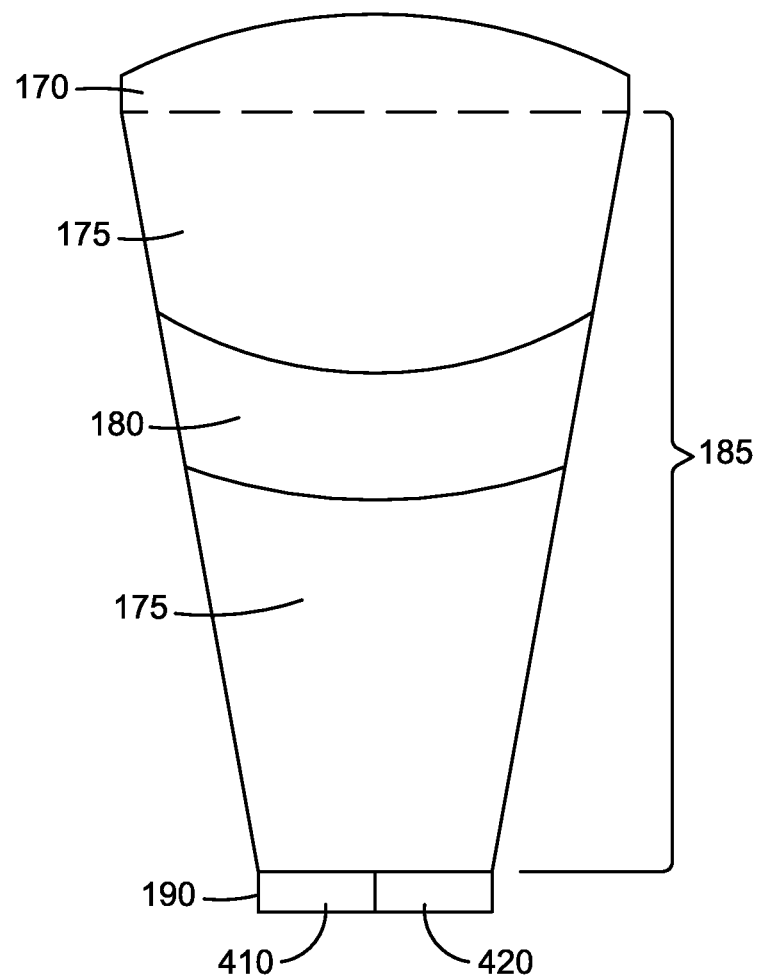
FIG. 6 depicts an embodiment of an optical sensor assembly used to measure the state of focus.

One construction of a consolidated detector subsystem as used in FIG. 4 is shown in FIG. 6, which is the heart of the present system. This subsystem contains the elements of a Detector Lens 170 offset from a three-dimensional region of scattering material within Structured Filter 185 by an intervening dielectric medium 175. The shape of the diffusing region within this sensor subsystem is controlled by design and the included scatterers may vary radially and/or axially with respect to the optical axis. The dielectric medium 175 is in intimate contact with the Detector 190 proper, and fills the space between it and the lens. The dielectric medium 175 may be any material, such as glass or a polymer that is suitable for controlling indices of refraction. The use of index contrasting material to fill the volume of the sensor that would otherwise be void serves to control reflections at boundaries between particles and the suspending dielectric medium, while eliminating the possibility that debris could interfere with a proper measurement. It should be seen that even in the case where the region around the scattering bodies is not filled with a refractive index controlling medium there will still be scattering of light in a similar manner, as long as there is a difference in refractive index between the scattering bodies and the medium in which they are immersed, because scattering depends upon discontinuity of refractive index at the boundaries of the scattering bodies, as described by classical Fresnel reflectance equations. An index matching anti-reflective coating may be applied to the outer surface of the scattering layer to suppress reflections.

In some systems it may be desirable for the volume of scattering material to be mounted directly onto the housing of the detector. One very compact option uses a Detector Lens 170 that is formed as a thick positive lens having a first surface which is convex and focuses on the second, opposite surface of the lens, and the Scattering region within the Structured Filter 185 is placed at the focus on that opposite surface. In such a configuration the first surface may be aspheric with the second surface being curved to correct for field curvature due to upstream optics and other factors.

A volume-averaging filter enlarges the size of the spot on the detector. By this means the incident beam is averaged not only laterally, or radially, relative to the optical axis, but also axially, that is, perpendicular to the surface of the Detector 190. In the case of segmented detectors, as shown in FIG. 4, this enlargement avoids total loss of light when the spot, which is focused on the detector, falls entirely in the gap between detector segments. Enlarging the spot by the effect of scattering reduces the effect of stray light, for example from unwanted reflections, because it tends to average the light over the two detection directions. An enlarged spot also allows the steepness of the focus curve to be tuned for optimization of the performance of a given system.

It should be noted that this method does not rely on detector segment, or pixel interpolation, rather the diverging volume is used to tune the gain of the focus sensing operation. The exact axial location of the diffusing filter gives the system designer a degree of freedom for adjustment of the slope of the focus curve. The diffuser may be spaced away from the detector for various purposes, such as to desensitize the detector to dirt, defects or gaps between elements. The closer the diffusing filter is to the detector, the steeper will be the slope, and the larger will be the effect of detector gaps, dirt, defects, etc. This feature allows for the gain of a particular system to be adjusted as desired for a specific application by varying the spacing between the diffusing filter and the detector, without introducing either offsets or biases in the measurement of focus. Exemplary systems using this tuning technique may have full-scale sensitivity from less than 10 micrometers to several millimeters of range. Such flexibility of design grants the ability to tune the range/resolution characteristics of a focus sensing device over a wide range in order to optimize the focus sensing instrument to the application in which it is used.

Several other functional attributes of the diffusing filter are controllable for various purposes. A few of these attributes are:

the size of in-homogeneous bodies or features in a transparent optical element;

the shape, whether flat or spherical, asymmetric, uniform or irregular, or other, and the distribution of shapes of these in-homogeneous bodies or features;

the refractive index of the in-homogeneous bodies or features, especially as compared to the refractive index of the transparent part of the matrix, where the refractive index of the former is dissimilar to, either greater than or less than, that of the transparent medium, or may comprise a mixture of both greater refractive particles and lesser refractive particles;

the concentration of these bodies or features;

the separate makeup of multiple such three-dimensional structures in a multilayered structure, and their relationship to each other;

the shape and disposition of elements of the detecting device;

the location of the optical structure with respect to optical elements having power (such as lenses and mirrors) that direct light onto the structure;

the thickness of the supporting substrate;

the surface finish of the surfaces nearest to the detector, including the presence or absence of reflection-altering coatings; and the surface finish of the three-dimensional object farthest from the detector.

Without the scattering filter, aberrations in the optical system cause the worst artifacts and errors to occur at or near focus where they are most damaging. Therefore, the volumetric effects of the scattering filter are most important at that location when the system is used to maintain exact focus. This is not to minimize the fact that the scattering filter does improve the focus curve throughout the entire range of focus sensing.

A suitably constructed filter in three dimensions generates a focus error curve that is substantially desensitized with regard to both non-ideal systemic behavior and corrupting effects at the surface which is being measured. Among the particularly novel elements of the optical system described here are the properties of the diffusing filter and its alignment to improve the focus curve. For correct operation, this diffusing filter is designed with consideration for the following properties:

A. The depth, or thickness, of the scattering region must be a low multiple of the aberration-altered depth of focus for a spot that would otherwise be focused on the detector. That is, the diffusing filter must have a thickness that exceeds the depth of ambiguities encountered when attempting to measure the axial location of focus. From another viewpoint, since the scattering region serves to restructure the wavefront, the axial extent of the three-dimensional amplitude or phase structure must be chosen so that the output represents a spherically symmetric surface. The exact depth ideally depends upon particular choices of lens focal lengths, focusing objective numerical aperture (NA) and aberrations present in the beam, although the most important focal length and numerical aperture is that of the converging lens immediately before the diffusing layer.

The shape of the focus error curve will change as the scattering depth of the Diffuser 180 increases. Thicknesses of the scattering layer up to 3 mm result in a focus error curve that becomes asymmetric. Therefore, the scattering layer should be only thick enough to remove artifacts that are observed in the focus error signal. To correct the asymmetry on either side of the best focus would otherwise require an undesirably significant reduction in servo bandwidth to ensure stability. This thickness varies with the performance of the Detector Lens 170 and other factors, such as the exact properties of the scattering layer, the degree to which the depth of focus is increased by aberrations, the wavelength of light, the size of the detector gap, and the degree to which the scattering layer directly affects the slope of the focus curve. As a practical matter, the best thickness value can often be more readily determined by experiment than by mathematical modeling, especially with regard to the depth of ambiguities.

B. In order to maintain reasonable alignment properties, the scattering layer should often be homogeneous in all three dimensions, although it may have properties that affect the amount of light that is back reflected versus the amount that is forward reflected.

C. The granularity of the Scattering Layer of Diffuser 180 within the Structured Filter 185 must be fine enough to eliminate artifacts in the detector's output signal when the focused spot is located at, in, or near the scattering region. If the granularity within the Diffuser 180 is larger than approximately one wavelength of the incident light projected through the scattering medium, the result may be artifacts in the focus error signal when the focal plane of the spot passes through the filter volume. Larger features risk generating slope variation on either side of focus. When a scattering filter is used that has scattering features that are too large and too thin axially, extreme artifacts are introduced, such as when common "invisible" or translucent plastic mending tape is placed in the optical path. The artifacts are concentrated where the beam happens to come to focus on the scattering layer. Severe corruption occurs when the scattering layer is suspended about 1 mm above the sensor. Distortion of the focus curve occurs in the immediate neighborhood of focus of the Detector Lens 170, while the rest of the curve is acceptable, when such focus falls upon an incorrectly designed scattering material volume.

D. Detectors may be nominally flat or curved. It should be remembered that, although the filter presents a two-dimensional pattern of irradiance at a detecting surface, the quantity measured, namely focus, is a point quantity; that is, the focused beam at the sample is focused to a spot, and would present a spot at the detector at best focus were it not for the action of the filter. In the presence of spherical aberration, it is advantageous to use a diffusing filter whose thickness is a few times the distance between paraxial and marginal foci. In this way the thickness of the scattering layer can be tuned to compensate for the amount of aberration that is present.

E. The scattering region should generally be isotropic, exhibiting uniformity in all directions. However; certain structures that are intentionally designed to be non-isotropic may also provide acceptable scattering effects, holographic scatterers or so-called "engineered diffusers" being one such class of structures.

F. Any transparent and optically well-behaved substrate material may be used with regard to refractive index of the scattering medium; the presently described embodiments use commonly available material having a refractive index of approximately 1.5.

G. The lateral dimensions of the scattering filter must be sufficiently large that no part of the beam is vignetted, or only partially affected, by the filter throughout the designed range of operation of the focus sensing system. Similarly, the scattering regions must be sufficiently large that no light bypasses the scattering region.

H. Ideally, the filtering medium should be non-absorbing in order to maximize the light gathering efficiency of the system.

I. The scattering pattern of an ideal scatterer may or may not be Lambertian, as that condition scatters widely. However, if sufficient light is present so that enough light falls on the detector to create a signal with acceptable signal level a quasi-Lambertian scatter may be acceptable. The preferred scattering property would restrict the forward scattered light to a chosen angular extent, and over that region the radiance of the scattering pattern should either be sensibly constant or smoothly varying. A Gaussian shape of the forward scattered radiance pattern is ideal. Thus, for a pupil obscuration focus sensing system at best focus, the location of the center of irradiance at the detector will not change if a portion of the illuminated area of the pupil is cut off, for example, by tilt at the surface of a specular target. This property leads to tilt invariance at the position of best focus so long as the converging beam is focused upon the scattering zone of the filter. Tilt-invariance is highly desirable and distinguishes the present system and method from previous focus system designs that do not place the detector at an image of the surface being measured. Systems that are not tilt invariant will defocus if the target surface tilts.

Rather than focusing the beam onto a diffuser to create a spot of light on a two-dimensional segmented detector as has been done by others, the three-dimensional filter here accepts a converging beam which varies so that the detector and diffusing filter improve the quality of the signal. It should be understood that the three-dimensional filter removes some information that is carried by the original wavefront (which was created by the focused spot on the sample) and thereby creates a new apparent extended source of light that has ideal properties for measurement of focus. Transforming the image of the spot that originated at the sample is a three-dimensional process, and the results are two-dimensional. In other words, the filter actually reduces the information carried by the incident light, information that is undesirable for robust measurement of focus. In the absence of the described filter the focus curve tends to have artifacts caused by wavefront errors that corrupt the focus curve. With this diffusing filter the slope of the curve is constant up to the limit where there is insufficient light to maintain constant total optical power on the detector. This results in an operating region that extends around focus and is accomplished with only two detecting elements to provide the full focus curve, with additional elements being superfluous.

The requirements for a diffusing filter such as has been described may be met by a subassembly constructed in the manner of FIG. 6. Such a diffusing filter has a characteristic granularity that is fine enough and deep enough to eliminate artifacts in the detector's signal that are caused by wavefront errors when the focused spot is located at, in, or near the scattering region. When properly aligned, this improves the focus curve. This improvement encompasses not only the immediate region around best focus, but also the entire range of measurement of departure from ideal focus. In this case the result is a very linear relationship that expresses not only the location of best focus, but also, just as importantly, a smooth and linear relationship between the amount of defocus and the output of the sensor. A significant benefit of the excellent linearity provided by the described system is that positional offsets may be controllably established and maintained in proportion to an electrical offset.

The properties listed above (as A-I) are three-dimensional in nature, and require a specific axial positioning of the diffusing volume and the lens which precedes it in order to operate properly. In addition to removing artifacts and errors from the focus curve, the scattering effect of the Diffuser 180 within the Structured Filter 185 also adds a degree-of-freedom to the design. Specifically, as the diffusing filter is located farther from the detector the slope of the focus curve becomes less steep.

Diffusing filters used in the past have operated in a two-dimensional mode, wherein the scattering region has intentionally been kept thin relative to the wavelength of light. To the contrary, the system described here departs from previous practices to operate in three-dimensions using an extended region of optical surfaces, optical materials and scattering regions for the measurement of a through-focus curve, rather than a position of a location.

The characteristics of the scattering region are only one part of the design of the presently described system. Another consideration is that when using laser light to measure focus curves it is necessary to take into account reflections from both surfaces of a diffusing filter because of the coherence of the laser source. Thin diffusing filters, where the thickness depends upon the coherence length of the laser, tend to modulate the straight line portion of the through focus curve, generating short wavelength ripples in the focus curve due to interference fringes in the reflected laser light. This manifests as local changes in the slope of the focus curve, which changes the gain of the servo loop causing transient oscillations in the loop.

When optical targets are illuminated by a coherent light source, interference effects can corrupt the signal returned by the detector. In some situations, it may be advantageous to use a spectrally-selective filter constructed to affect the coherence or state of polarization of the beam, so as to avoid errors associated with measuring focus in monochromatic, polarized or coherent light.

The generation of a through-focus error curve is modified by varying the distance between the scattering region and the detector, and also by the degree of translucence of the scattering layer, among other features and operations. For the present discussion, a translucent material is one that has features arranged in three dimensions so as to spread a beam of light laterally in a controlled manor as the focus of the beam travels a large axial distance on either side of focus as compared to the thickness of the diffusing region. As used here a translucent material is taken to mean one that scatters light without absorbing it.

The material used for the scattering layer may derive its translucence by employing amplitude and/or phase modifying properties, or both. This is a complex transformation involving both real and imaginary components. Amplitude effects are typically controllable by varying the depth of the scattering region as well as the grain size and shape of the scattering bodies within the scattering medium, in addition to the refractive index and reflectance of the scattering bodies to suppress artifacts caused by wavefront errors. Phase effects rely on the introduction of controlled changes in phase throughout the scattering region. Although these phase changes are deterministic their effect may be essentially random; that is they can produce a distribution of light that is, for example, essentially Gaussian in distribution. One useful phase object is an engineered diffusing structure which is based on the phase changes of fully transparent materials, with micro-lenses being just one example.

With the addition of a suitably designed diffusing volume, the focus sensing system is protected from the corrupting influences in the target or the focus measuring optical system. The result is a focus sensing system that has a focus curve that is ideal in its slope, smoothness and linearity, and which is simultaneously insensitive to tilt. This result is exceptionally effective and extremely useful for measuring and controlling the state of focus of an optical system.

Satisfaction of the aforementioned requirements for an optical focus sensor that employs a volume scattering element is accomplished, in one form, by the composition and construction which will now be described. The object of the construction is to uniformly suspend sub-wavelength particles having a high index of refraction into a medium having optical properties that are compatible with other components of a larger system of which the diffusing filter is a part.

A preferred medium is a liquid polymer that can be cured to a solid. When the polymer is in its liquid state the refractive material may be mixed in to a desired concentration and distribution. Curing the polymer to a solid then maintains structural stability with the desired geometrical and physical optical properties. One usable class of media is a single component liquid adhesive that cures to a hard polymer. Use of an adhesive that has controlled optical properties allows for the inclusion of optical lenses and even detectors in the same subassembly.

There are many usable options for the translucent material and scattering material. With proper selection, translucence may be accomplished from reflective effects resulting from a purely imaginary refractive index. Alternately, a complex refractive index, which is partially absorbing, may be obtained by using a metallic powder to produce translucence.

A sintered dielectric may be used to produce a structured filter from a powdered absorber without any need to be suspended in a transparent medium.

When the diffusing filter assembly is encapsulated in an optically opaque container, stray light is reduced. This improves the signal-to-noise ratio of the sensor. These features combine to produce an ideally shaped through-focus curve that is steep and smooth through focus, due to an excellent signal level, as well as being long and flat away from focus, thereby providing an excellent capture range.

One process for accomplishing the construction of a Structured Filter such as that described above is as follows.

I) Select a polymer, to be used as an adhesive, for properties related to curing and its liquid versus solid characteristics, as well as for its control of scattering. Controlled scattering provides the usual benefits of averaging, especially better SNR (signal-to-noise ratio), and better immunity to point disturbances such as stray reflections. However, in this situation the averaging is spatial rather than temporal which results in improved SNR without loss of bandwidth. Controlled scattering also reduces the effect of aberrations, particularly spherical aberrations (SA) and coherence effects.

II) Apply a small amount of the selected uncured polymer directly onto the detecting surface.

III) Use the surface tension of the liquid polymer to manipulate the curvature of the envelope. The curvature may be negative, positive or zero (flat). This allowance to shape the resulting lens can be used to improve the collection efficiency and to extend the capture range of the optical assembly. This capability is in addition to other characteristics of lens design, such as localizing light for high gain in the center of the lens.

IV) Cure the adhesive polymer to a structurally stable state in order to preserve spatial relationships and to protect the detector. The structurally stable state need not be a solid as long as it is capable of controlling the distribution of suspended particles. The cured state is not necessarily rigid as it may have some pliability. Using a polymer here provides an inexpensive means of protecting the detector that is extremely shock resistant. Curing may be accomplished by any of several means, such as by temperature, evaporation, exposure to UV light, or by inherent self-curing, among others, depending upon the selected polymer.

V) Add other layers as appropriate to provide other filtering properties such as colored material for wavelength selection, antireflective coatings, and additional protection from environmental effects. More subtle refractive properties comparable to doublet or triplet lenses may be incorporated without the necessity to grind or polish difficult materials like glass.

The remainder of the optical system is then designed around the properties of the assembly constructed by this process. Alignment of the overall system is made easier because a technician is able to see into the scattering layer during the alignment process. It is possible to exploit the simultaneous very steep slope in the center with the extended capture range to average out stray light. The resulting optical system has benefits comparable to a logarithmic detector, except that it is very linear in the center and very non-linear away from center.

The optical system described here has many degrees of freedom to provide control over a multitude of properties that are somewhat independent of one another. It will be obvious to those having skill in the art that changes may be made to the details of the above-described embodiments without departing from the underlying principles of the invention. The scope of the present invention should, therefore, be determined only by the following claims.

What is claimed is:

1. An optical sensor assembly comprising:
   a structured filter; and
   a detecting surface in intimate contact with the structured filter,
   wherein the structured filter comprises:
      a transparent medium having a first index of refraction; and
      a scattering material comprising suspended particles,
      wherein the suspended particles comprise:
         greater refractive particles having a second index of refraction that is greater than the first index of refraction; and
         lesser refractive particles having a third index of refraction that is less than the first index of refraction.

2. The optical sensor assembly of claim 1, wherein the structured filter comprises a translucent material that derives its translucence purely from amplitude effects.

3. The optical sensor assembly of claim 1, wherein the structured filter includes phase changing elements.

4. The optical sensor assembly of claim 1, wherein the structured filter comprises a translucent material that derives its translucence from reflective effects resulting from a purely imaginary refractive index.

5. The optical sensor assembly of claim 1, wherein the structured filter comprises a translucent material that derives its translucence from a complex refractive index.

6. The optical sensor assembly of claim 1, wherein the structured filter comprises a powdered absorber.

7. The optical sensor assembly of claim 1, wherein the structured filter comprises suspended particles that have a grain size that is selected to suppress artifacts caused by wavefront errors.

8. The optical sensor assembly of claim 1, wherein the suspended particles comprise titanium dioxide ($TiO_2$).

9. The optical sensor assembly of claim 1, wherein the suspended particles comprise spherical beads.

10. The optical sensor assembly of claim 1, wherein the transparent medium is a polymer.

11. The optical sensor assembly of claim 1, wherein the transparent medium is curable to a solid.

12. The optical sensor assembly of claim 1, wherein the transparent medium is UV-curable.

13. The optical sensor assembly of claim 1, wherein the transparent medium is temperature curable.

14. The optical sensor assembly of claim 1, wherein the transparent medium is self-curing.

15. The optical sensor assembly of claim 1, wherein the transparent medium is curable by evaporation.

16. The optical sensor assembly of claim 1 constructed by a method comprising:
   producing the structured filter, wherein the step of producing the structured filter comprises:
      acquiring the transparent medium;
      acquiring a dielectric medium including the suspended particles; and
      suspending the dielectric medium in the transparent medium;
   mounting a first surface of the structured filter to the detecting surface; and
   curing the dielectric medium to a structurally stable state to control a distribution of the suspended particles.

17. The optical sensor assembly of claim 16, wherein a detector lens is mounted to the structured filter at a second surface of the structured filter that is opposite the first surface of the structured filter.

18. The optical sensor assembly of claim 16, wherein the step of producing the structured filter further comprises:
shaping the dielectric medium to form a detector lens prior to the step of curing the dielectric medium.

* * * * *